United States Patent

Toyone

[11] Patent Number: 5,458,662
[45] Date of Patent: Oct. 17, 1995

[54] PROCESSED COCONUT OUTER HUSK CHOPS AND PROCESS FOR PRODUCING SAME

[76] Inventor: Minoru Toyone, 1-11 Ohizumi-cho 1-chome, Nerima-ku, Tokyo-to, Japan

[21] Appl. No.: 146,893

[22] Filed: Nov. 1, 1993

[51] Int. Cl.$^6$ .............................. A01G 1/00; A01G 7/00; A01G 9/02
[52] U.S. Cl. .................. 47/58; 47/9; 47/66; 47/DIG. 10
[58] Field of Search .................. 47/58.09, 58.10, 47/58.16, 58.26, 58.27, 9, 58, 66, DIG. 10

[56] References Cited

FOREIGN PATENT DOCUMENTS

| | | |
|---|---|---|
| 63-52848 | 2/1985 | Japan . |
| 2234612 | 9/1990 | Japan . |
| 4304815 | 10/1992 | Japan . |
| 6-23 | 1/1994 | Japan . |

OTHER PUBLICATIONS

Nazareth et al. 1987. International Biodeterioration. 23:343–355.
Salisbury et al. 1978. Plant Physiology. Second Edition. p. 82.
Patent Abstracts of Japan, vol. 016, No. 387 (C–0975) 18 Aug. 1992 & JP-A-04 126 015 (Mitsubishi Materials Corp) 27 Apr. 1992, abstract.
Patent Abstracts of Japan, vol. 014, No. 548 (C–0785) 5 Dec. 1992 & JP-A-02 234 611 (Toyone M) 17 Sep. 1990, abstract.
Patent Abstracts of Japan, vol. 013, No. 423 (C–638) 20 Sep. 1989 & JP-A-01 161 084 (Toyone M) 23 Jun. 1989, abstract.
Database WPI, Week 9043, Derwent Publications Ltd., London, GB; AN 90–325592 & JP-A-2 234 612 (Toyone M), abstract.

*Primary Examiner*—David T. Fox
*Assistant Examiner*—Erich E. Veitenheimer
*Attorney, Agent, or Firm*—Jordan and Hamburg

[57] ABSTRACT

Processed coconut outer husk chops, including coconut outer husk chops produced by compressing coconut outer husk at substantially right angle to the directions of coirs and chopping the compressed coconut outer husk. A reference sample of a resulting coconut outer husk chop which was left at 20° C. at 50% relative humidity for three days contains 0.01–2 wt % tannin and 0.15–0.6 wt % $Fe_2O_3$. Each processed coconut outer husk chop is sufficiently porous, and has a shape holding power, a good drainage, a low tannin content and a high iron content. A process for producing processed coconut outer husk chops is disclosed. The processed coconut outer husk chops are suited to a planting material, an inert medium for hydroponics and a microorganism propagating bed for propagating a decontaminating microorganism nurtured with a malodorous substance and trace pollutant in air.

9 Claims, No Drawings

PROCESSED COCONUT OUTER HUSK CHOPS AND PROCESS FOR PRODUCING SAME

BACKGROUND OF THE INVENTION

The present invention relates to processed coconut outer husk chops which drain well, have a low tannin content and a high iron content and are used as a planting material, an inert medium for hydroponics and a bed for propagating the decontaminating microorganism suited to propagation of a decontaminating microorganism eliminating a malodorous substance and a trace pollutant from air.

Conventionally, sphagnum, pumice, hydroculture and peat moss have been used as a planting material in cultures of flowering plants such as an orchid, a chrysanthemum, a carnation, a cyclamen and a Turkey broad bellflower, of foliage plants, of high grade vegetables such as a celery, a melon and a strawberry, and of fruit trees. These materials rot easily or serve as an ineffective media for growing plants. In particular, they cause plants to poorly spread their roots.

Recently, in culturing vegetables such as a celery, a melon, a lettuce, a tomato and a strawberry, hydroponics has become popular. The seeds are implanted in an inert medium containing no nutrient, and properly prepared nutrients are fed to the vegetables to forcibly culture them without pollution by various germs to secure high quality and yield of the vegetables.

Requirements of an inert medium for hydroponics include a hardness sufficient to hold a plant to be cultured, pores to hold air and a nutrient solution, the ability to drain well and cause the roots of the plant to spread well, and being clean. Now, rock wool is widely used as the inert medium for hydroponics in view of the root spread and the porosity.

While it is not preferable that a planting material has a high tannin content because tannin shrinks the plant root to suppress growth of the plant, the ligneous part of the plant has a high tannin content, and coconut outer husk also has a high tannin content. Thus, when coconut outer husk is used as the culture medium, a plant cannot sufficiently grow on account of the influence of tannin. Even if coconut outer husk is repeatedly subjected to a water soaking in order to previously remove tannin, tannin seeps little by little for a long time. Thus, a sufficient amount of tannin cannot be removed from coconut outer husk.

The present inventor provided in Japanese examined patent application publication SHO. 63-52848 a planting material suited to a culture medium in a flowerpot and in a soil amelioration. This planting material comprises coconut outer husk chops which were compressed at substantially right angle to the direction of coirs and subsequently chopped. The compression facilitated the seeping of tannin into water during water soaking of the coconut outer husk, so that a cycle of the water soaking and the dehydration of the coconut outer husk is repeated twice or three times to sufficiently reduce the tannin content so as not to adversely affect growth of a plant. Since the coconut outerhusk chops have the elasticity of a sponge to take in air, they provide a desirable planting material.

However, when the prior art processed coconut outer husk chops are used as the planting material in the flowerpot, they must be repeatedly subjected to the cycle of the water soaking for about 10 hours, the dehydration for the seepage of tannin before use. Since the coconut outer husk is previously compressed, tannin very easily seeps into water from it. Thus, the repeated cycle can remove tannin from coconut outer husk until tannin dies bit cause a problem for the growth of the plant.

In hydroponics, the inert medium after harvesting of the plant has root fragments adhering thereto and the root fragments enable pathogenic fungi to grow, so that the inert medium can be repeatedly used only three or four times. While the used inert medium must be discarded, rock wool does not decompose at all nor can it be incinerated at all. Thus, discarding a large volume of rock wool after harvesting of a plant causes environmental pollution.

Since the inert medium for hydroponics is not expected to feed a plant with a nutrient, the composition of a nutrient solution to be fed must be continuously changed in response to the growth stage of the plant. The inert medium preferably has a buffering action of absorbing and storing the nutrient when the amount of the nutrient is excessive and gradually releasing the nutrient when the amount of the nutrient is deficient. While rice hulls have such buffering action, they do not have a sufficient buffering action.

In addition, hydroponics tends to provide poor drainage and cause root rot. While the drainage power of an inert medium with a large number of coirs is enhanced, the fertilizer holding power of the inert medium is reduced.

Therefore, hydroponics cannot ideally grow a plant. The ligneous part of a plant has the fertilizer holding power and on the other hand contains much tannin. As described above, tannin shrinks the plant root to suppress growth of the plant, so that the inert medium with much tannin is not desirable.

In addition, there is a process for removing a malodorous substance from air in which the air with the malodorous substance is forcibly passed through the bottom of a column charged with an absorbent. In this process, the absorbent completely fails when the quantity of the malodorous substance exceeds the capacity of the absorbent, so that the absorbent must be frequently replaced and the pressure drop through the column with the absorbent is high. Thus, this process has many problems in practice.

Recently, a process has been proposed which comprises the steps of charging a column with a peat moss or ceramic material, propagating a particular microorganism nurtured with a particular pollutant on the surface of the peat moss or ceramic material, and passing air with the pollutant through the column to clean the air.

However, a stiff porous microorganism propagating bed cannot be obtained which has a high affinity with the particular microorganism and does not much increase an air passage resistance even if numerous microorganisms propagate. Thus, this process does not have the expected advantage.

SUMMARY OF THE INVENTION

The present invention provides processed coconut outer husk chops comprising coconut outer husk chops produced by compressing raw coconut outer husk at substantially right angles to the direction of coirs of the raw coconut outer husk and subsequently chopping the raw coconut outer husk, and, if necessary, coirs and powder derived from coconut outer husk. A reference sample of the processed coconut outer husk chops left at 20° C. at 50% relative humidity for three days contains 0.01–2 wt % tannin. The processed coconut outer husk chops are used as the planting material in the flowerpot, a planting soil ameliorator, an inert medium for hydroponics and a propagating bed for the microorganism nurtured with the malodorous substance from air.

A process for producing processed coconut outer husk chops comprises the steps of compressing raw coconut outer husk at substantially right angles to the direction of coirs in the raw coconut outer husk, water soaking the compressed coconut outer husk together with iron to be swollen, compressing the swollen coconut outer husk to be dehydrated, repeating at least twice a cycle of the steps of water soaking the compressed coconut outer husk together with iron to be swollen and compressing the swollen coconut outer husk to be dehydrated, drying the dehydrated coconut outer husk resulting from the repeated step, compressing the dried coconut outer husk so that the thickness of the dried coconut outer husk is reduced to about ⅔–⅓, and chopping the compressed dried coconut outer husk.

Alternatively, the cycle of the steps of water soaking the compressed coconut outer husk together with iron to be swollen and compressing the swollen coconut outer husk to be dehydrated need not be repeated.

The present invention is an improvement in prior art processed coconut outer husk chops produced by compressing raw coconut outer husk at substantially right angles to the direction of coirs in the raw coconut outer husk and chopping the compressed coconut outer husk. The present invention reduces the tannin content until tannin does not become harmful to growth of a plant, and increases the iron content. Therefore, the inventive processed coconut outer husk chops are directly applicable as the planting material in the flowerpot and also as the inert medium for hydroponics.

In addition, since the inventive processed coconut outer husk chops further comprise the coirs and the powder derived from the coconut outer husk, they have both water and fertilizer holding power and water draining power which appears to be inconsistent with each other at the same time.

This is effective particularly to a from-bottom nutrient solution and water feed system which has recently become popular. Conventionally, water and fertilizers have been fed to the planting material from above it. The system of feeding water and fertilizer from the bottoms of planting vessels or flowerpots can feed water and fertilizer to many planting vessels or flowerpots at a time. This is very desirable in the performance of water feeding and fertilizing. Although the from-bottom water and fertilizer feed system tends to rot the plant root unless it employs a planting material of a good drainage, the inert medium for hydroponics must have the water holding power. Therefore, the inventive processed coconut outer husk chops also provide the inert medium appropriate to the from-bottom water and fertilizer feed system.

In the process for producing the inventive processed coconut outer husk chops, coexistence of the iron with the compressed coconut outer husk promotes seepage of tannin and facilitates the processed coconut outer husk chops to incorporate iron in a form to be easily absorbed by a plant. Thus, the inventive processed coconut outer husk chops appropriate to growth of the plant and to propagation of the microorganism are produced.

Since the inventive processed coconut outer husk chops are produced by repeating the cycle of the compression and the swelling of the coconut outer husk, the volume of the processed coconut outer husk chops to be used, which have fully been swollen, increases 1.5–2 times. In addition, since each processed coconut outer husk chop has a high porosity, it supplies a planting soil with much air, swells when a moisture about the processed coconut outer husk chop increases and, on the other hand, shrinks when the moisture about the processed coconut outer husk chop decreases. Repeating the cycle of the swelling and the shrinkage of the processed coconut outer husk chops prevents the planting soil from loosing pores to become solid, i.e., maintains softness of the planting soil for a long time to remarkably enhance the root spread.

Since the coirs are stiff, they resist rot and can continue to be in service for more than two or three years.

In addition, a stiffness of the coirs and the repeating of the cycle of the compression and the swelling of the coconut outer husk provides the inventive processed coconut outer husk chops with the shape holding power of maintaining substantially initial interstices between the coirs of each processed coconut outer husk chop which swells to secure a larger bulk thereof. This larger bulk enables numerous microorganisms to be implanted into the processed coconut outer husk chops and secures the free passage of air and water. Thus, passing the air with the pollutant through the processed coconut outer husk chops promotes propagation of the microorganisms nurtured mainly with the pollutant, so that the microorganisms positively take in the pollutant and change it into an unharmful substance to process a large volume of the air with the pollutant.

In addition, since the microorganism propagating bed of the inventive processed coconut outer husk chops is porous, the pressure drop through a column of the processed coconut outer husk chops is low even if the height of the column is great. Thus, the column of the processed coconut outer husk chops can process the air with the pollutant at a high linear velocity.

DETAILED DESCRIPTION OF THE INVENTION

The inventive processed coconut outer husk chops comprise coconut outer husk, i.e., the residue of coconut from which the nut and the inner husk are separated, and the epicarp, if necessary. In the nut, valuable coconut milk is filled, and the inner husk is a raw material of activated charcoal. Since the epicarp is thin, it need not positively be removed. The inventive processed coconut outer husk chops provide a dried porous product produced by repeating the cycle of water soaking, dehydration, drying and pressing the coconut outer husk to swell 1.5–2 times in water.

While the inventive processed coconut outer husk chops are dry, they have a certain moisture content because they are organic substances. The moisture content in the inventive processed coconut outer husk chops varies in response to ambient humidity and temperature. Therefore, the tannin content and the iron content of the reference sample of the processed coconut outer husk chops which was left at 20° C. at 50% relative humidity for three days were determined.

The tannin content in the reference sample is 0.01–2 wt %, preferably, 0.1–1 wt % and, more preferably, 0.1–0.6 wt %. When the tannin content exceeds 2 wt %, excessive tannin is previously removed so that the processed coconut outer husk chops can be used as the planting material in the flowerpot. If the processed coconut outer husk chops containing more than 2 wt % tannin are directly used as the planting material in the flowerpot, the presence of excessive tannin may retard growth of the plant in the flowerpot.

Even the processed coconut outer husk chops containing more than 2 wt % tannin may be directly used with no problem when they are mixed with the planting soil. The processed coconut outer husk chops have a very low tannin content and a high iron content, so that the iron content gives a black-rich brown appearance to the processed coconut outer husk chops.

Iron is a trace element essential to growth of a plant and participates in synthesizing chlorophyll. An insufficient iron content makes the leaves of the plant yellow. In the present invention, iron combines with the texture of the coconut outer husk in the form to be easily absorbed. In addition, the combination of iron with the texture of each coconut outer husk has a buffering action of supplying iron to the plant without excess or deficiency.

The inventive processed coconut outer husk chops may further comprise simple coirs and powder derived from coconut outer husk. The coirs outside coconut outer husk chops serve as pipes for draining excessive water through the bottom of the planting vessel. The powder distributes excessive water uniformly throughout the planting material in the planting vessel. Since the coconut outer husk chops absorb excessive water, the whole of the processed coconut outer husk chops drains well, and has a large amount of both water holding power and fertilizer holding power. Thus, the processed coconut outer husk chops have both high drainage and high water holding power which appear to be inconsistent with each other. The processed coconut outer husk chops may be used alone in the planting vessel or the flowerpot.

Alternatively, a mixture of the processed coconut outer husk chops and another planting material may be used. On the other hand, the processed coconut outer husk chops may be mixed with the planting soil. In this case, 50-liter of processed coconut outer husk chops are blended every 3.3 m² area of the planting soil and on the other hand, 100-liter of processed coconut outer husk chops are required as a planting soil for a rose cultivation.

For the inert medium for hydroponics, the processed coconut outer husk chops are used alone or together with another inert medium. The processed coconut outer husk chops have an advantage particularly when applied to the from-bottom water and nutrient solution feed system. Since used processed coconut outer husk chops can be used as the soil ameliorator and a fertilizer, they are valuable and much more advantageous than rock wool causing environmental pollution.

The bed of the processed coconut outer husk chops for propagating decontaminating microorganisms is charged in the air cleaner column through which the air with the pollutant is passed. The air with the pollutant is passed through the air cleaner column from the bottom to the top thereof. Conversely, the air with the pollutant may be passed in the opposite direction. Water required for growth of the microorganisms may be intermittently fed.

Pollutants in air comprise malodorous substances such as organic amine and hydrogen sulfide. A simple passage of the air with these malodorous substances through the air cleaner column charged with the processed coconut outer husk chops of the invention can remove only about 20% of malodorous substances. However, when the air containing the same malodorous substances is continued to be passed through the air cleaner column charged with the processed coconut outer husk chops in presence of a suitable supply of water for a long time, the particular microorganisms nurtured mainly with particular malodorous substances gradually propagate. Thus, the propagation of microorganisms becomes positive and acts to remove the malodorous substances and the processed coconut outer husk chops finally remove 99% or more of the malodorous substances.

When the microorganism-propagating bed cleaning column is provided next time, the microorganisms propagating in another microorganism propagating bed are transplanted to the present microorganism propagating bed at the beginning in order to rapidly achieve an ideal state of almost completely removing the malodorous substances from the air.

The microorganism propagating bed charged with the processed coconut outer husk chops can continue to be in service for two or three years and the used microorganism propagating bed can be used as good fertilizer.

In producing the processed coconut outer husk chops, raw coconut outer husk is divided into four or five pieces in the form of a boat in the directions of coirs, and these coconut outer husk pieces are compressed at substantially right angles to the direction of the coirs so that the thickness of each elongate coconut outer husk piece is reduced to about $2/3$–$1/5$ times of the initial thickness.

The elongate coconut outer husk need not be compressed at exactly right angles to the direction of the coirs but must only reduce transverse distances between respective coirs so that the coirs cannot be broken. Thus, it is supposed that the texture between the coirs is broken and facilitates the seepage of tannin into water when the coconut outer husks are soaked in the water.

The compressed elongate coconut outer husk pieces and the iron are left in water for one night or longer. As the iron, an ordinary steel sheet, a water soaking vessel of iron or scraps of iron is used. Iron having no rustproofing finish and easily rusted is preferably used. While the water soaking vessel of iron may be used for seeping tannin, the water soaking vessel is not durable, because it continuously issues iron into water. Therefore, the water soaking vessel of iron is not preferable as the iron source. A vessel of iron of which the external surface is coated with an anticorrosive material serves as the water soaking vessel for seeping tannin in water during the water soaking without the need for the special iron source. Water used in the seepage of tannin has a black-rich brown color, and the product also has a black-rich brown color.

The most preferable iron source is more than three sheets of ordinary steel. The elongate coconut outer husk pieces are located between the sheets of steel to form a layer of elongate coconut outer husk pieces.

Since the pressed elongate coconut outer husk pieces are left together with the iron source in water for one night to swell and restore substantially their initial thickness, the swelling elongate coconut outer husk pieces are compressed by a press to about $2/3$ in thickness. In this case, the press compresses the elongate coconut outer husk pieces at substantially right angles to the direction of the coirs. Even a single cycle of the swelling and the compression of the elongate coconut outer husk pieces can have the advantage of the present invention.

However, the compressed elongate coconut outer husk pieces are preferably placed together with the iron source in water for one night or longer, again. The cycle of the swelling and the compression of the elongate coconut outer husk pieces is repeated three or four times. The degree of coloring of water decreases and the amount of issuing tannin is reduced every repeat of the cycle. After tannin is seeped, the elongate coconut outer husk pieces are well dried. Since the dried elongate coconut outer husk pieces are bulky, they are compressed to $1/2$–$1/4$ in thickness.

The compressed elongate coconut outer husk pieces are chopped to have a length of 3–50 mm, preferably, 5–20 mm, more preferably 7–10 mm. The processed coconut outer husk chops comprise coconut outer husk chops with desirable sizes, a small volume of powder and a small volume of coirs produced by chopping compressed elongate coconut outer husk pieces. In particular, when the compressed elongate coconut outer husk pieces are chopped using a rotary cutter at high peripheral speed of 50–800 m/min, preferably, 100–600 m/min, the powder content and the coir content are greater. In practice, the processed coconut outer husk chops comprising certain quantities of the powder and coirs derived from the coconut outer husk chops are better as the planting material than the processed coconut outer husk chops without the powder and coirs derived from the coconut outer husk chops.

As described above, the processed coconut outer husk chops which are produced by performing at least one cycle of the compression, the water soaking, the dehydration, the drying and chopping of the elongate coconut outer husk pieces may comprise powder and coirs derived from the coconut outer husk chops. Each of the processed coconut outer husk chops has the form of a grain with a major diameter of a suitable length, e.g., 5 mm or more, preferably, 5–10 mm. Each of the coirs has a length of 0.3–5 cm, preferably, 0.5–3 cm. The composition ratio of coconut outer husk chop:coir:powder is 30–92:4–40:3–20, preferably, 40–88:6–20:6–20.

EXAMPLES

EXAMPLE 1

The nut and the hard inner husk were removed from each coconut. Coconut outer husk was divided substantially into quarters. Each elongate coconut outer husk piece was flattened by pressing to about ½ in thickness. The flattened elongate coconut outer husk pieces were left together with scraps of iron in water in a water tank of concrete for one night. Next day, water had a black-rich brown color and the elongate coconut outer husk pieces swelled. The swelling elongate coconut outer husk pieces were compressed by a press so that the thickness of each compressed elongate coconut outer husk was reduced to about ⅔. The compressed elongate coconut outer husk pieces were left together with the scraps of iron in water in the water tank, again. The cycle of the water soaking and the compression of the elongate coconut outer husk was repeated four times. The compressed elongate coconut outer husk pieces produced every repeated cycle were dried and left at 20° C. at 50% relative humidity for three days.

Table 1 shows tannin contents, moisture contents and iron contents measured in wt% in the resulting elongate coconut outer husk pieces.

TABLE 1

|  | Moisture Content | Tannin Content |
|---|---|---|
| Water soaked once | 15 | 1.95 |
| Water soaked twice | 18 | 0.99 |
| Water soaked three times | 16 | 0.63 |
| Water soaked four times | 17 | 0.19 |

Compressed dried coconut outer husk pieces derived from coconut outer husk pieces which were water soaked without the presence of an iron source had 3.52 wt % tannin and trace iron. Water in the water tank after four times water soaking is extremely less colored than water after once water soaking. The coconut outer husk pieces after four times compression were subjected to solar drying.

Since the resulting dried coconut outer husk pieces were incompact, they were compressed so that the thickness of each dried coconut outer husk pieces was reduced to the thickness about ⅔. The compressed coconut outer husk pieces were chopped using a chopper rotating at 400 RPM. The chopper has three rotating arms of an about 15-mm long streched from the center of the chopper, and at the each end of arms a rotary cutter is mounted. The resulting processed coconut outer husk chops comprise 80 wt % coconut outer husk chops with a 6-mm or more major diameter, 10 wt % coirs of a length of 0.3 cm or longer and 10 wt % powder which are derived from the coconut outer husk.

The apparent volume of the processed coconut outer husk chops which swelled in water for twenty-four hours was increased about 1.6 times and water was almost not colored.

The swelling processed coconut outer husk chops were placed in the flowerpots and cyclamens were planted on May 15. The cyclamens were grown by the from-bottom water and nutrient solution feed method. In October, the cyclamens had a number of flower buds and they sequentially vitally came into flowers for five months. In October, the cyclamens were pulled off the flowerpots, the white root of cyclamens were well spread so as to grow along the overall interior surface of the flowerpot. On the other hand, when a peat moss and leaf mold were used as the planting material in the flowerpots, the cyclamens root rotted, so that the cyclamens in the flowerpot were not valuable.

EXAMPLES 2 and 3 and CONTROLS 1 and 2

Hydroponics of celery

A celery was hydroponically cultured using as an inert medium of the processed coconut husk chops produced according to EXAMPLE 1. A test period was May 15, 1992 to Jul. 13, 1992. The number of celeries to be cultured per unit area was 40. EXAMPLE 2 provided a test area where the processed coconut outer husk chops derived from the coconut husk pieces four times water soaked in EXAMPLE 1 were used as the inert medium. EXAMPLE 3 provided a test area where rice hulls and the processed coconut outer husk chops derived from the coconut husk pieces four times water soaked in EXAMPLE 1 were blended equally in volume were used as the inert medium. CONTROL 1 provided a test area where simple rice hulls were used as the inert medium. CONTROL 2 provided a test area where simple rock wool was used as the inert medium.

Table 2 shows the measured average number of leaves per plant and the measured size of the largest leaf.

Table 3 shows the ratio of wound leaves due to calcium deficiency.

Table 4 shows the average yield by weight per plant.

Table 5 shows the ratio of plants having wound leaves due to calcium deficiency to the total number of the cultured plants.

TABLE 2-1

| Examination data | EXAMPLE 2 | | EXAMPLE 3 | |
|---|---|---|---|---|
| | Number of leaves | Size of largest leaf (cm) | Number of leaves | Size of largest leaf (cm) |
| May 15 | 3.1 | 16.3 | 3.0 | 15.0 |
| May 22 | 5.0 | 22.3 | 4.2 | 21.1 |
| May 29 | 6.1 | 30.3 | 5.8 | 27.1 |

TABLE 2-1-continued

|  | EXAMPLE 2 | | EXAMPLE 3 | |
|---|---|---|---|---|
| Examination data | Number of leaves | Size of largest leaf (cm) | Number of leaves | Size of largest leaf (cm) |
| June 5 | 8.4 | 42.8 | 8.2 | 36.3 |
| June 12 | 10.2 | 52.9 | 9.6 | 49.3 |
| June 19 | 11.0 | 58.7 | 10.1 | 58.7 |
| July 13 | 16.6 | 75.0 | 16.6 | 70.0 |

TABLE 2-2

|  | CONTROL 1 | | CONTROL 2 | |
|---|---|---|---|---|
| Examination data | Number of leaves | Size of largest leaf (cm) | Number of leaves | Size of largest leaf (cm) |
| May 15 | 2.9 | 15.9 | 3.7 | 16.2 |
| May 22 | 4.5 | 21.5 | 4.3 | 23.5 |
| May 29 | 6.2 | 30.3 | 5.6 | 32.5 |
| June 5 | 8.8 | 42.2 | 8.6 | 43.6 |
| June 12 | 9.9 | 51.7 | 8.8 | 54.2 |
| June 19 | 10.7 | 57.7 | 10.6 | 58.7 |
| july 13 | 17.0 | 70.0 | 15.0 | 66.8 |

TABLE 3

|  | Total number of leaves | Number of decayed leaves | Ratio of decayed leaves (%) |
|---|---|---|---|
| EXAMPLE 2 | 16.6 | 0 | 0 |
| EXAMPLE 3 | 16.6 | 3.4 | 20.5 |
| CONTROL 1 | 17.0 | 4.2 | 24.7 |
| CONTROL 2 | 15.0 | 6.6 | 44.0 |

TABLE 4

|  | Average yield by weight (g) |
|---|---|
| EXAMPLE 2 | 898 |
| EXAMPLE 3 | 783 |
| CONTROL 1 | 854 |
| CONTROL 2 | 614 |

TABLE 5

|  | Number of cultured plant | Number of plants having decayed leaves | Ratio of plants having decayed leaves | Degree of decay |
|---|---|---|---|---|
| EXAMPLE 2 | 40 | 9 | 23 | Leaf front ends were slightly wound. |
| EXAMPLE 3 | 40 | 24 | 60 | Leaf blades of five plants were decayed. Leaf front ends of the other plants were decayed. |
| CONTROL 1 | 40 | 32 | 80 | Leaf blades of ten plants were decayed. Leaf front ends of the other plants were decayed. |
| CONTROL 2 | 40 | 40 | 100 | Leaf blades of twenty plants were decayed. Leaf front ends of the other plants were decayed. |

TABLE 5-continued

|  | Number of cultured plant | Number of plants having decayed leaves | Ratio of plants having decayed leaves | Degree of decay |
|---|---|---|---|---|

Tables 2–5 demonstrate that the processed coconut husk chops provided the inert medium for hydroponics causing no leaf decay. In addition, the used processed coconut husk chops were mixed with a planting soil to soften the soil and produce a remarkable soil amelioration.

EXAMPLE 4

Spacer layers of ceramic rings and propagating beds of the processed coconut husk chops held in a special net for a decontaminating microorganism were alternately charged in an air cleaner column having a 900 mm diameter and a 4.6 m height. The air cleaner column has a structure in which a fan forcibly passes air through the bottom of the column, upwardly through the layers of microorganism propagating beds of the processed coconut outer husk chops and discharges the air from the top of the column.

The processed coconut outer husk chops with an about 8-mm average particle size the reference sample of which contained 0.63 wt % tannin were used as the microorganism propagating bed. Before used, the processed coconut outer husk chops were water soaked. The volume of the microorganism propagating bed of the processed coconut outer husk chops swelled from about 1 $m^3$ to 1.67 $m^3$. The total height of six layers of the microorganism propagating beds was 1.8 m.

A group of microorganisms having a power of removing hydrogen sulfide was transplanted from another air cleaner column to the present air cleaner column. Water was sprinkled over the layers of the microorganism propagating beds at 25 liters/min for 2 min with 1 hour intervals. Air with 5 ppm hydrogen sulfide was passed through the air cleaner column and an outlet harmful gas concentration was determined. At the beginning, the aircleaner had a removal or rejection ratio of about 30% of the harmful gas. Subsequently, the rejection ratio of the harmful gas was increased to 99.8% four month after the beginning of the test. In this case, the outlet hydrogen sulfide concentration was 0.01 ppm, and the linear velocity of fed air was 0.2 m/sec., and the pressure drop through the air cleaner column was 40 mm Hg.

When the linear velocity of fed air was 0.3 m/sec., the outlet hydrogen sulfide concentration 0.02 ppm, and the rejection ration of hydrogen sulfide was 99.6% four months after the beginning of the test, and the pressure drop through the air cleaner column was 52 mm Hg.

When the linear velocity of fed air was 0.35 m/sec., the outlet hydrogen sulfide concentration was 0.04 ppm, and rejection ratio of hydrogen sulfide was 99.2% four months after the beginning of the test, and the pressure drop through the air cleaner column was 80 mm Hg.

EXAMPLE 5

Air with hydrogen sulfide and ammonia at ratios shown in Table 6 was cleaned. The processed coconut outer husk chops were tested as the material for the microorganism propagating bed in the same manner as those of EXAMPLE 4 except that EXAMPLE 5 used the air with hydrogen sulfide and ammonia at ratios shown in Table 6.

Table 6 shows test results. In EXAMPLE 5, an increase in the pressure drop through the air cleaner column was almost not found after a continuous service for one year.

TABLE 6

| linear velocity meter/sec. | Pressure drop mm mm Hg | Inlet gas concentration | | Outlet gas concentration | | Rejection ratio | |
|---|---|---|---|---|---|---|---|
| | | $H_2S$ ppm | $NH_3$ ppm | $H_2S$ ppm | $NH_3$ ppm | $H_2S$ % | $NH_3$ % |
| 0.2 | 46 | 5 | 12 | 0.01 | 0.05 | 99.8 | 99.6 |
| 0.3 | 52 | 5 | 10 | 0.02 | 0.1 | 99.6 | 99.0 |
| 0.35 | 78 | 5 | 10 | 0.04 | 0.1 | 99.2 | 99.0 |

CONTROL 3

A peat moss was tested as the material for the microorganism propagating bed in the same manner as the processed coconut outer husk chops of EXAMPLE 5. A linear velocity of air passing through the air cleaner column was to be 0.2 m/sec. so that the outlet hydrogen sulfide concentration was 0.02 ppm and the outlet ammonia concentration was 0.1 ppm. In this case, the pressure drop through the air cleaner column was 60 mm Hg and durability of the peat moss was very low.

CONTROL 4

A porous ceramic was tested as the material for the microorganism propagating bed so that the other procedure was the same as that of EXAMPLE 5. A linear velocity of air passing through the air cleaner column was to be 0.15m/sec. so that the outlet hydrogen sulfide concentration was 0.02 ppm and the outlet ammonia concentration was 0.1 ppm.

The present invention is not rigidly restricted to the EXAMPLES described above. It is to be understood that a person skilled in the art can easily change and modify the present invention without departing from the scope of the invention defined in the appended claims.

What is claimed is:

1. Processed coconut outer husk chops, consisting essentially of coconut outer husk chops produced by at least three cycles of compressing raw coconut outer husks at substantially right angles to the direction of coirs of the raw coconut outer husks and soaking the compressed coconut outer husks in water in the presence of iron, the resulting coconut outer husk chops containing 0.1–1wt % tannin.

2. The processed coconut outer husk chops as recited in claim 1, further comprising:
   coirs and powder derived from the processed coconut outer husk chops.

3. The processed coconut outer husk chops as recited in claim 1, wherein the processed coconut outer husk chops constitute a planting material for use in a flowerpot.

4. The processed coconut outer husk chops as recited in claim 1, wherein the processed coconut outer husk chops constitute a soil conditioner.

5. The processed coconut outer husk chops as recited in claim 1, wherein the processed coconut outer husk chops constitute an inert medium for hydroponics.

6. The processed coconut outer husk chops as recited in claim 1, wherein the processed coconut outer husk chops constitute a microorganism propagating bed for a microorganism absorbing a malodorous substance in air.

7. The processed coconut outer husk chops as recited in claim 1, wherein the tannin content of the processed coconut outer husk chops is 0.1–0.6wt. %.

8. A process for producing processed coconut outer husk chops, comprising the steps of:
   compressing raw coconut outer husks at substantially right angles to the direction of coirs in the raw coconut outer husks;
   soaking the compressed coconut outer husks in water in the presence of iron, resulting in swollen coconut outer husks;
   compressing the swollen coconut outer husks, resulting in dehydrated coconut outer husks;
   repeating, at least thrice, a cycle of said steps of soaking the compressed coconut outer husks in water in the presence of iron and compressing the swollen coconut outer husks;
   drying the dehydrated coconut outer husks resulting from said repeated steps;
   compressing the dried coconut outer husks; and
   chopping the compressed dried coconut outer husks.

9. The processed coconut outer husk chops produced by the method of claim 8.

* * * * *